Nov. 5, 1968 D. E. NORTON 3,409,883

BALANCED COMMON INHIBIT SENSE SYSTEM

Filed April 6, 1964 2 Sheets-Sheet 1

INVENTOR
DAVID E. NORTON

BY

Carl C. Kling
ATTORNEY

FIG. 2
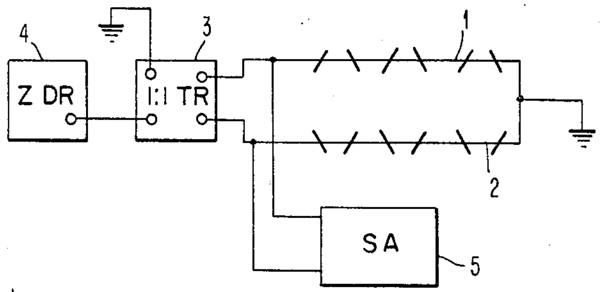
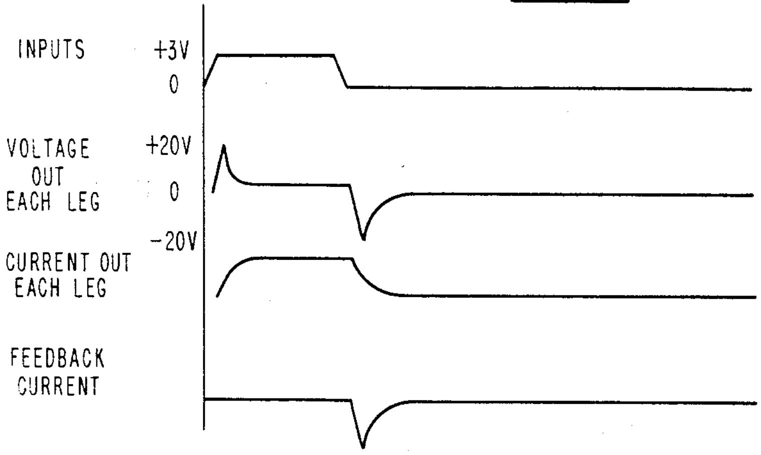
FIG. 4
FIG. 5, FIG. 6
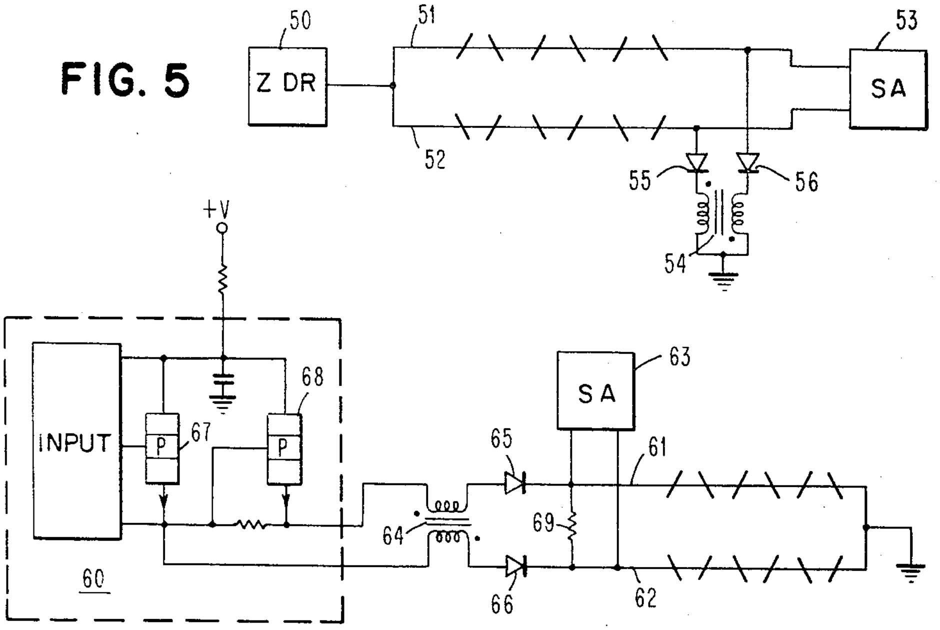
FIG. 6

United States Patent Office 3,409,883
Patented Nov. 5, 1968

3,409,883
BALANCED COMMON INHIBIT SENSE SYSTEM

David E. Norton, Poughkeepsie, N.Y., assignor to International Business Machines Corporation, New York, N.Y., a corporation of New York Filed Apr. 6, 1964, Ser. No. 357,360
13 Claims. (Cl. 340—174)

ABSTRACT OF THE DISCLOSURE

This circuit discloses the use of a transformer to balance the drive currents on two inhibit sense core windings connected in series across the input of a sense amplifier. The primary transformer is connected in series with one of the inhibit-sense core windings and the driver, and the secondary of the transformer is connected in series with the other inhibit-sense core winding so that the inhibit current pulses on each of the core windings are equalized by the transformer coupling.

BACKGROUND OF THE INVENTORY

This invention relates to magnetic core matrix storage and particularly to a transformer coupled balanced common inhibit sense drive circuit for such a magnetic core matrix.

CHARACTERISTICS OF INVENTION

*Environment*

Magnetic core matrices of the bit organized or 3D type have become common in the computer art. Such magnetic core matrices generally include four wires threading each core which wires may be identified as X, Y, inhibit and sense respectively.

The function of the X and Y wires during a write operation is to provide half select write currents calculated to set the related core to the one value. The function of the inhibit wire is to carry during the write operation an oppositely polarized half select current, the magnetic effect of which reduces the magnetic effect of the combined X and Y wire currents to a value insufficient to set the related core to the one value.

The function of the X and Y wires during a read operation is to provide half select currents calculated to drive the core to zero. The sense winding's function during the read operation is to accept output signals from any core which switches as a result of the combined magnetic effect of X and Y half select currents. If the core contains a one, its switching induces a signal on the sense winding. If the core contains a zero, it further saturates and provides no signal to the sense winding.

Since the inhibit function occurs only during the write operation, and since the sense function occurs only during the read operation, it is possible to combine the inhibit and sense functions on a single wire, thus facilitating winding of the core matrix.

The magnitude of the inhibit half select current, however, with respect to the extremely small output signal, is such that a sense amplifier circuit designed to respond to the small output signal becomes saturated upon application of the inhibit signal. Balancing of the inhibit signal by applying it coincidently to both halves of a differental sense amplifier is a known technique for minimizing this saturation of the sense amplifier. Circuits for providing inhibit drive currents while minimizing saturation effects have, however, not been entirely satisfactory.

*Objects*

An object of the invention is to provide an improved inhibit drive-sense amplifier connection which permits a more effective isolation of the sense amplifier from the inhibit driver.

A further object of the invention is to provide an improved inhibit drive termination which permits a more effective isolation of the sense amplifier from the inhibit driver by controlling the waveshape of the inhibit pulse, particularly during its fall.

*Features*

A feature of the invention is a coupling of the inhibit driver to a first row of cores and to a second row of cores simultaneously via a transformer, and a diode resistor connection of both the first and the second rows of cores to opposite sides of the differential amplifier.

Another feature of the invention is a characteristic impedance termination for the fall of the inhibit drive pulse which is essentially an open circuit during the rise and plateau of the inhibit drive pulse.

Another feature of the invention is a connection of an additional transistor in the termination path to prevent collector overshoot of the inhibit drive transistor during the fall of the inhibit drive pulse.

*Advantages*

The advantage of the invention is that its improved isolation of the inhibit driver from the sense amplifier permits a faster recovery of the sense amplifiers and thus permits a read operation to follow more closely a preceding write operation.

The foregoing and other objects, features and advantages of the invention will be apparent from the following more particular description of a preferred embodiment of the invention as illustrated in the accompanying drawings.

DESCRIPTION OF EMBODIMENT

*Drawings*

FIGURE 2 is a schematic block diagram of the inhibit driver and sense amplifier connections to related rows of magnetic cores.

FIGURE 4 is a timing diagram.

FIGURES 5 and 6 show additional embodiments.

*Summary (see FIGURE 3)*

Figure 1:
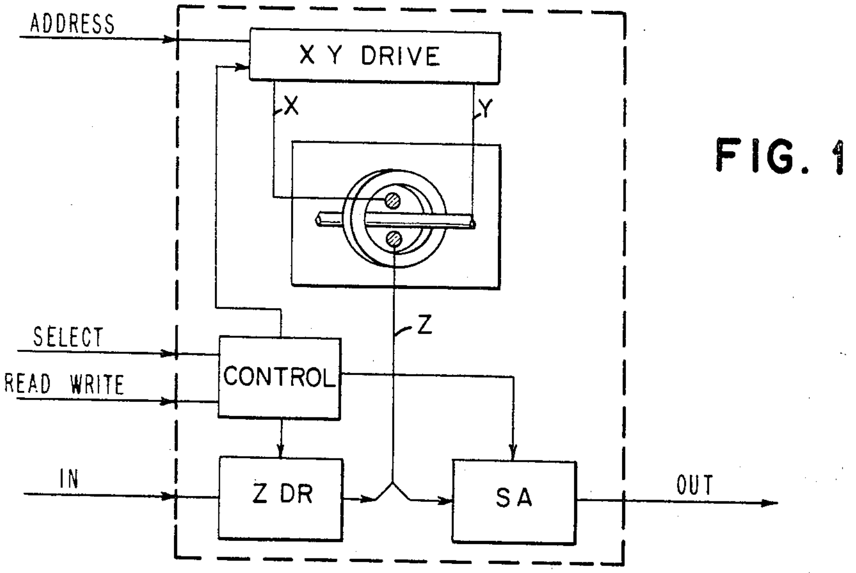
FIGURE 1 is a block diagram of a magnetic core storage system incorporating the invention.

The invention is a transformer coupled balanced common inhibit sense circuit for a magnetic core memory. Two rows of magnetic cores on row windings 1 and 2 are connected via 1:1 transformer 3 to inhibit driver 4. Wires 1 and 2 are directly connected across differential sense amplifier 5. A diode resistance network in the input to the differential amplifier provides isolation of the differential amplifier from the relatively large inhibit voltage transitions. At termination of the inhibit half select current pulse, the negative going voltage transient on the common inhibit sense lines 1 and 2 is connected via the characteristic impedance through an auxiliary transistor 13 to the collector of driver transistor 4 to prevent collector overshoot.

*Details*

FIGURE 1 illustrates the three-wire bit organized ferrite core arrangement of the subject memory. The X and Y drive wires form many intersections, each intersection defining a particular core. Half select currents on selected X and Y wires select a core for switching. One core is shown. The Z wire which traverses the same core selectively carries half select current of opposite polarity to inhibit switching of the X–Y selected core, at write time, thus causing storage of a 0 instead of storage of a 1.

The cores are wired on frames which are stacked together in an array, and driven by X and Y drivers and Z drivers to select and selectively inhibit the approximate words of cores. Sense amplifiers accept the data read out during a memory reference and apply this data to a "data out" bus. Data is fed back via a "data in" bus to the Z drivers for regeneration of the cores (fetch cycle), or new data is provided (store cycle).

Basic address control is by a memory address register, which through decoders controls X and Y drive according to the chosen address. Timing and control mechanism affects all drivers and strobes the sense amplifier as necessary to provide proper operation.

FIGURE 2 is a simplified schematic of the invention. Two strings of cores 1 and 2 are affected simultaneously. Each of the two strings is terminated to ground, and connected via 1:1 transformer 3 to the inhibit driver 4, and connected directly to the differential sense amplifier 5. The inhibit driver supplies current to line 2 directly and to line 1 via 1:1 transformer 3.

Figure 3:
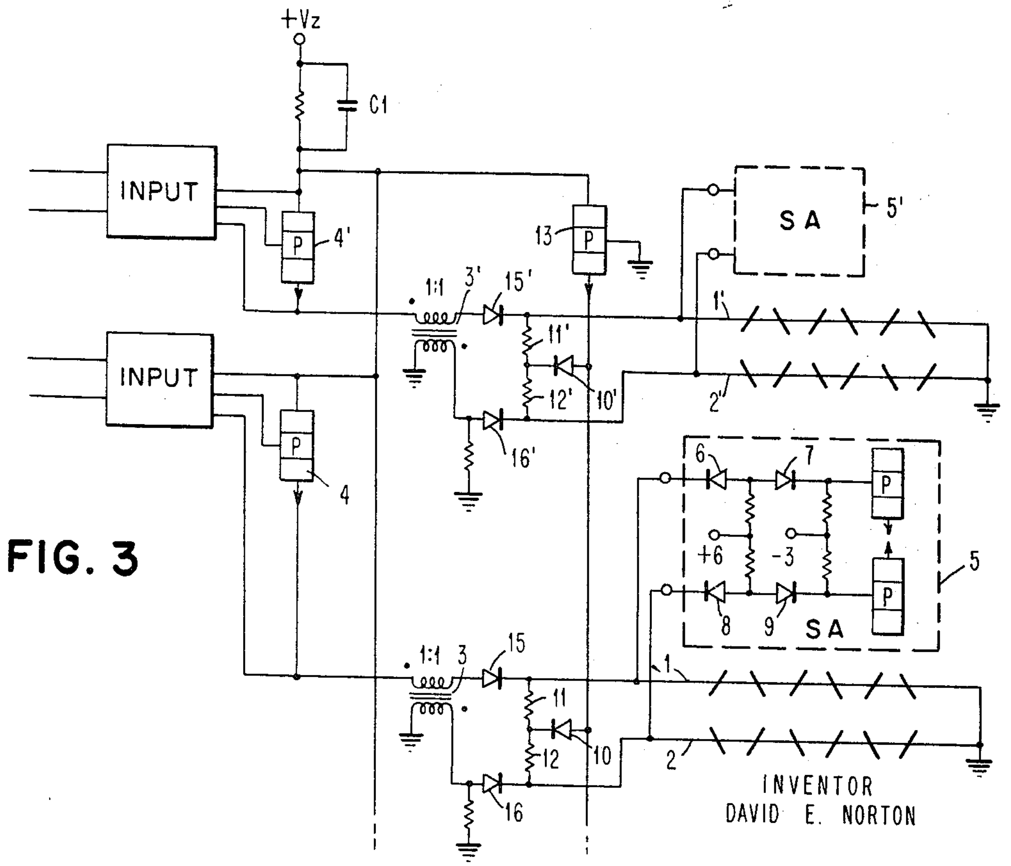
FIGURE 3 is a detailed schematic diagram of the inhibit driver circuit and its connections to the cores and to the sense amplifier.

FIGURE 3 shows the operation of two inhibit driver circuits in detail. There is one inhibit driver circuit for each inhibit sense segment in the plane. (Several inhibit sense winding segments are used, rather than a single winding, because wire length creates capacitance problems, noise and delay problems.) Inhibit driver transistor 4 affects both strings 1 and 2 equally by virtue of 1:1 transformer 3, which divides the drive pulse equally to the two strings 1 and 2. Diodes 6, 7, 8 and 9 isolate differential sense amplifier 5 during the inhibit drive pulse. During the read operation, the diodes remain forward biased because the core output signal voltages are too low to reverse bias the diodes. Diode 10 and resistors 11 and 12 provide a termination for lines 1 and 2, on the trailing edge of the inhibit pulse, and also provide via auxiliary transistor 13 a pulse to prevent collector overshoot of transistor 4 on turnoff. Since only one inhibit sense segment is operative at any one time, auxiliary transistor 13 can serve transistor 4, transistor 4', and the equivalent drive transistors for the several segments. There may be, for example, eight segments.

FIGURE 4 shows waveforms of operation. When transistor 4 turns off, a negative excursion of about 30 volts appears on each of wires 1 and 2. This forward biases diode 10 through resistors 11 and 12 and forward biases the emitter base junction of transistor 13. This terminates lines 1 and 2, during the fall of the inhibit current, in their characteristic impedances, preventing reflections. The collector current of transistor 13, fed back to the collector of transistor 4, limits the voltage applied across transistor 4. Diodes 7 and 9 protect sense amplifier 5 from the voltages present during this turn off of the inhibit drive pulse. The pulses unblocked by diodes 6–9 are equal at the two differential inputs of sense amplifier 5 and cancel each other.

During sensing, one core only within strings 1 and 2 is driven to the 0 state by X and Y currents. This core, if already at the 0 state, will produce no significant output and the sense amplifier will forward a 0 bit. The core, if previously at the 1 state, changes state and induces on its Z-sense winding a signal of sufficient magnitude to affect the sense amplifier. If the core is in string 1, as shown, its output passes through string 1, through diodes 6 and 7, which remain forward biased because the sense signal is too small to reverse bias them, to sense amplifier 5. Since there is no core switched in string 2, there is no signal transmitted along the path 2, 8, 9 to the other side of a sense amplifier 5, and a difference is sensed.

*Operation—FIGURES 3 and 4*

Transistor 4 has an input circuit of any suitable type. B. R. Sowter, "Non-Saturating Driver Circuit," IBM Technical Disclosure Bulletin, volume 6, Number 1, June 1963, page 123, describes one such input circuit.

With input deconditioned, transistor 4 is off and its collector is at +V (60 volts). There is no current through the primary of transformer 3, which keeps transistor 13 off. Lines 1 and 2 remain at ground potential.

With input conditioned, transistor 4 conducts through the primary of transformer 3 along core winding 1 to ground. Current through the primary of transformer 3 induces an equal current through the secondary of transformer 3 along core winding 2 to ground. The voltages associated with the currents along windings 1 and 2 appear at the differential inputs of sense amplifier 5.

The array load is a short circuited transmission line and behaves much like a lumped constant inductor of a few microhenries. Therefore, when current is driven into the array, the voltage jumps to about 25 volts, decaying exponentially to a standing voltage of about 2.8 volts as the current rises.

Deconditioning its input turns off transistor 4. When its output current starts to decrease, the voltage drops negatively to about −20 volts. This forward biases diode 10 and turns on transistor 13 through resistors 11 and 12.

Resistors 11 and 12 act as terminating resistors for the lines during the fall time and are substantially equal to the characteristic impedance of the line. This prevents reflections during the fall of the inhibit drive current pulse.

The off voltage dropping to −20 volts on the outputs places −40 volts on the emitter of transistor 4. Transformer 3 does this as the sum of the output voltages appears at the emitter of transistor 4. If collector overshoot should occur, that is, if the collector of transistor 4 were allowed to rise to about 60 volts, as much as 100 volts would be placed across transistor 4 as it switched off. Such a high voltage presents both a breakdown and a power dissipation limitation upon transistor 4.

The collector overshoot problem is eliminated by feeding back the off transient current through transistor 13. This keeps the collector emitter voltage of transistor 4 at less than 60 volts, and limits its off transient power. The off current through diode 10 and transistor 13 decays exponentially to zero, turning off transistor 13 and reverse biasing diode 10. This feedback arrangement ensures that the voltages applied to prevent collector overshoot are closely related both in time and in value to the situation.

The use of transformer 3 lowers the on power of transistor 4 and the current requirements of +V by a factor of two. The switching and supplied power are essentially the same. The current is halved but the voltage is almost doubled; there is a constant in switching resistive power for a certain current I and time derivative $dI/dt$.

*Current balancing*

FIGURE 5 shows a transformer current balanced common inhibit sense circuit for a magnetic core matrix. Driver 50 provides a current which divides into substantially even halves along core winding wires 51 and 52, the inhibit sense wires. Wires 51 and 52 connect to opposite sides of differential sense amplifier 53. The inhibit pulses being equal and being applied at opposite sides of differential sense amplifier 53, the sense amplifier remains substantially unaffected.

The inhibit pulses on wires 51 and 52 are maintained equal by their termination via transformer 54. Diodes 55 and 56 prevent circulating of current.

If the current in wire 51 should be of different magnitude than the current in wire 52, transformer 54 passes the difference to balance the current in the wires. This enhances the balancing with respect to the sense amplifier, and helps control the inhibit current values at the half select level. The impedance of wires 51 and 52 vary according to the data states of the cores. The resulting imbalance of currents on the wires could become a problem, if the balancing feature were omitted.

FIGURE 6 shows a magnetic core matrix common inhibit sense circuit with individual inhibit drive transistors and with transformer balancing of drive currents. Driver 60 provides two output pulses, one on each of wires 61 and 62. Sense amplifier 63 is arranged to accept outputs from the cores during sensing. Transformer 64 performs the balancing function for the currents impressed upon wires 61 and 62. Diodes 65 and 66 prevent circulating currents. Inhibit driver 60 includes two series connected drive transistors, 67 and 68. Resistance 69 functions as an output resistance for the sense amplifier.

The preferred embodiments show a direct connection of the inhibit driver via the primary of 1:1 coupling transformer 4 to one of the pair of core winding wires. The driver could terminate to ground through the primary of a 2:1:1 transformer having two secondaries, each secondary connecting to an individual core winding wire, but such a connection does not guarantee equality of the two secondary currents.

FINAL SUMMARY

The invention is a transformer balanced inhibit sense circuit for a magnetic core memory. Balanced and well defined inhibit drive currents are important in maintaining a necessary equality of two related core winding wires, so that electrical transients on the two wires can cancel across the differential inputs of a sense amplifier.

Coupling the two wires across a 1:1 transformer maintains a current balance between the two wires. The inhibit drive pulse is defined at its trailing edge by a transistor feedback circuit which prevents collector overshoot buildup of voltage at the driver transistor.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A common inhibit drive sensing circuit for a magnetic core matrix of the type having a number of pairs of inhibit sense windings connecting differentially to related sensing means and also to related inhibit driving means, characterized by:

auxiliary feedback means connected to both windings of a pair of windings and to said inhibit driving means for feeding back to the inhibit driving means a signal responsive to the voltage transient occurring at the conclusion of the inhibit drive pulse to thereby limit voltage buildup at the inhibit driving means.

2. A common inhibit drive sensing circuit for a magnetic core matrix of the type having a number of pairs of inhibit sense windings connecting differentially to related sensing means and also to related inhibit driving means, characterized by:

auxiliary feedback means connected to both windings of a pair of windings and to said inhibit driving means for feeding back to the inhibit driving means a signal responsive to the voltage transient occurring at the conclusion of the inhibit drive pulse to thereby limit voltage buildup at the inhibit driving means; and transformer means coupling each winding of a pair of windings in such fashion that the inhibit current pulses on each winding are equalized.

3. A common inhibit drive sense circuit for a magnetic core matrix, comprising:

(a) a core array including a number of pairs of magnetic core windings including a first pair, each pair having two magnetic core windings each traversing a related group of cores;

(b) sensing means;

(c) means for connecting pairs of magnetic core windings in differential fashion to said sensing means;

(d) inhibit driver means;

(e) means coupling at least one winding of said first pair to said inhibit driver means in such fashion that said inhibit driver means selectively produces on said winding an inhibit drive pulse of current; and (f) transformer means interconnecting said winding and the other winding of said pair for providing compensation to make the current in one of said windings equal to the current in the other of said windings.

4. A common inhibit drive sense circuit according to claim 3, wherein said means coupling connects one magnetic core winding of said first pair to said inhibit driver means but does not connect the other magnetic core winding of said first pair to said inhibit driver means.

5. A common inhibit drive sense circuit according to claim 3, wherein said means coupling connects said inhibit driver means to both magnetic core windings of said first pair at a common point.

6. A common inhibit drive sense circuit according to claim 3, wherein said inhibit driver means comprises individual first and second drive members and said means coupling individually connects said first drive member to one magnetic core winding of said first pair and individually connects said second drive member to the other magnetic core winding of said first pair.

7. A common inhibit drive sense circuit according to claim 3, comprising in addition:

(h) auxiliary means, coupled to said inhibit driver means, for feeding back to said inhibit driver means an electrical signal effective to limit voltage buildup during turn off of said inhibit driver means.

8. A common inhibit drive sense circuit according to claim 7, comprising:

(i) unidirectional conducting means coupling both magnetic core windings of said first pair to said auxiliary means, via resistances approximating the characteristic impedance of the related magnetic core windings.

9. A common inhibit sense drive circuit according to claim 3, comprising in addition:

(h) auxiliary means, coupled to said inhibit driver means, for feeding back to said inhibit driver means an electrical signal effective to limit voltage buildup during turn off of said inhibit driver means; and (i) unidirectional conducting means connecting both magnetic core windings of each of said pairs to said auxiliary means, via resistances approximating the characteristic impedances of the related magnetic core windings.

10. In a magnetic core matrix with a common inhibit-sense circuit having two inhibit-sense core windings connected in series across the input of a sense amplifier, the improvement comprising:

an inhibit driver and a primary of a transformer connected in series with one of the inhibit-sense core windings and a secondary of the transformer connected in series with the other of the inhibit-sense core windings so that the inhibit current pulses on each of the windings are equalized by the transformer coupling.

11. The inhibit driver system of claim 10 wherein the inhibit driver is connected in series with the secondary of the transformer across said other of the inhibit sense windings.

12. The inhibit sense system of claim 10 wherein diodes are connected in series with the transformer windings and the core windings.

13. The inhibit driver system of claim 10 wherein the transformer windings are in a 1:1 ratio.

References Cited

UNITED STATES PATENTS

| | | | |
|---|---|---|---|
| 3,112,470 | 11/1963 | Barrett et al. | 340—174 |
| 2,915,740 | 12/1959 | Ricketts et al. | 340—174 |

BERNARD KONICK, *Primary Examiner.*

P. SPERBER, *Assistant Examiner.*